(12) United States Patent
Kim et al.

(10) Patent No.: US 9,407,859 B2
(45) Date of Patent: Aug. 2, 2016

(54) METHOD FOR REPRODUCING MOVING PICTURE AND MOBILE TERMINAL USING THIS METHOD

(75) Inventors: Donghyuk Kim, Gyeongsangbuk-Do (KR); Sungwan Park, Gyeonggi-Do (KR); Namhee Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 12/939,124

(22) Filed: Nov. 3, 2010

(65) Prior Publication Data

US 2011/0312375 A1 Dec. 22, 2011

(30) Foreign Application Priority Data

Jun. 18, 2010 (KR) ........................ 10-2010-0058240

(51) Int. Cl.
*H04M 1/00* (2006.01)
*H04N 5/765* (2006.01)
*H04N 5/77* (2006.01)

(52) U.S. Cl.
CPC .............. *H04N 5/765* (2013.01); *H04N 5/772* (2013.01)

(58) Field of Classification Search
CPC .......... G01C 21/3647; H04N 21/2343; H04N 21/47202
USPC ............. 455/556.1; 386/241; 348/185, 399.1, 348/333.05, 333.11
See application file for complete search history.

(56) References Cited

U.S. PATENT DOCUMENTS

| | | | | |
|---|---|---|---|---|
| 6,642,939 B1* | 11/2003 | Vallone et al. | ...... | G06F 11/1417 348/E5.105 |
| 2002/0010926 A1* | 1/2002 | Lee | ..................... | H04N 5/44513 725/40 |
| 2003/0063125 A1* | 4/2003 | Miyajima et al. | .............. | 345/781 |
| 2003/0204849 A1* | 10/2003 | Watanabe | ........................ | 725/62 |
| 2005/0033758 A1* | 2/2005 | Baxter | ........................ | 707/100 |
| 2006/0029374 A1* | 2/2006 | Park | ..................... | G11B 27/002 386/241 |
| 2007/0027949 A1 | 2/2007 | Park et al. | | |
| 2007/0047925 A1* | 3/2007 | Araki | ............................ | 386/125 |
| 2007/0168413 A1* | 7/2007 | Barletta et al. | ................ | 709/203 |
| 2009/0100462 A1* | 4/2009 | Park et al. | ........................ | 725/38 |

FOREIGN PATENT DOCUMENTS

| | | |
|---|---|---|
| KR | 10-2003-0038852 A | 5/2003 |
| KR | 10-2007-0011811 A | 1/2007 |

* cited by examiner

*Primary Examiner* — Kwasi Karikari
*Assistant Examiner* — Edward Zhang
(74) *Attorney, Agent, or Firm* — Birch, Stewart, Kolasch & Birch, LLP

(57) ABSTRACT

According to an embodiment of the present invention a moving picture reproduction method includes reproducing, via a display on the mobile terminal, a moving picture, extracting, via a controller on the mobile terminal, a still picture at an interrupted timing if the moving picture reproduction is interrupted, generating, via controller, a first thumbnail image by combining the extracted still picture with information about a reproduction rate, and displaying, via the display, the generated thumbnail image on a moving picture list.

16 Claims, 5 Drawing Sheets

FIG. 2
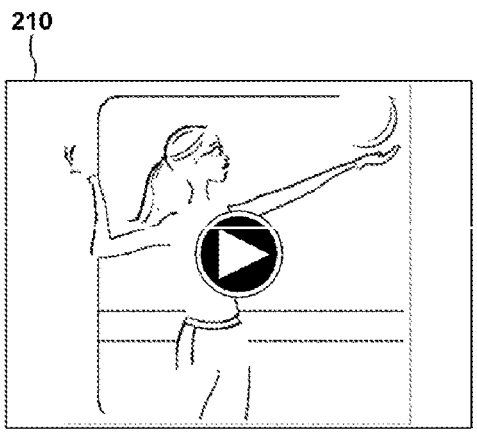
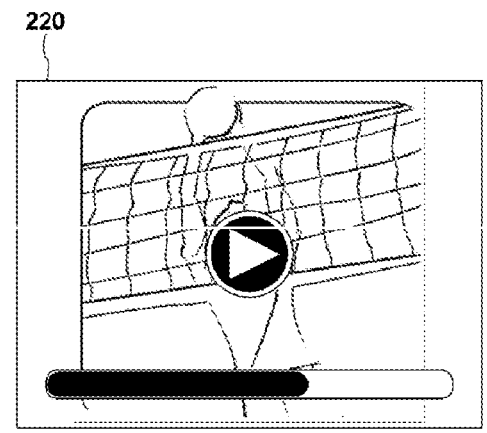
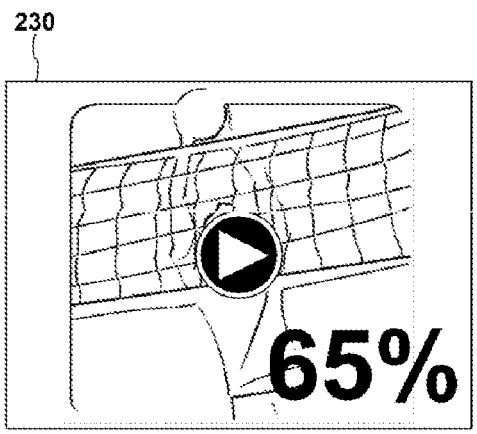
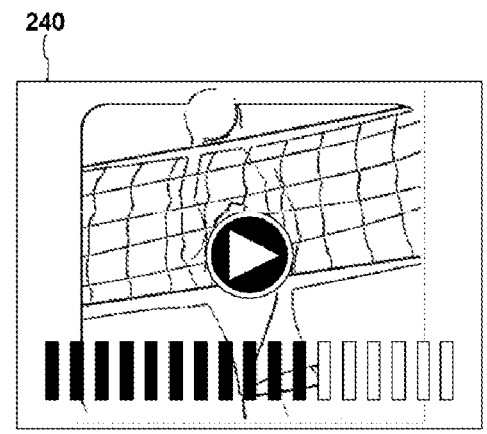

METHOD FOR REPRODUCING MOVING PICTURE AND MOBILE TERMINAL USING THIS METHOD

CROSS-REFERENCE TO A RELATED APPLICATION

Pursuant to 35 U.S.C. §119(a), this application claims the benefit of earlier filing date and right of priority to Korean Application No. 10-2010-0058240, filed on Jun. 18, 2010, the contents of which is incorporated by reference herein in its entirety.

BACKGROUND OF THE INVENTION

1. Field of the Invention

The present disclosure relates to moving picture reproduction, and more particularly, to a moving picture reproduction method and a mobile terminal using the same method.

2. Description of the Related Art

In general, terminals may be divided into a mobile or portable terminal and a stationary terminal according to whether or not terminals are movable. In addition, mobile terminals may be divided into a handheld terminal and a vehicle mount terminal according to whether or not users can directly carry it around.

As the functions of terminals are becoming more diverse, terminals can support more complicated functions such as capturing images or video, reproducing music or video files, playing games, receiving broadcast signals, and the like. By comprehensively and collectively implementing such functions, mobile terminals are embodied in the form of a multimedia player or device. In order to support and increase functions of the terminals, improvement of structural part and/or software part of terminals may be considered.

In general, a terminal in the related art stores a plurality of moving pictures and then allows the user to select a moving picture to view it. At this time, to allow the user to easily select his or her desired moving picture, the terminal in the related art displays a text type list, an still picture type list, or the like.

However, the terminal in the related art can provides only text information such as a moving picture title and the like, or provide only limited graphic information such as a representative picture allowing the user to guess the content of a moving picture, and thus information on the reproduction history of a specific moving picture (for example, whether the relevant moving picture has been previously interrupted while being viewed, etc.) cannot be provided to the user.

SUMMARY OF THE INVENTION

The objective of the present disclosure is to provide a moving picture reproduction method for allowing the user to intuitively grasp the reproduction-interrupted position or reproduction progress state of a moving picture and a mobile terminal using the same method.

In order to implement the foregoing objective, a moving picture reproduction method according to an embodiment of the present disclosure may include reproducing a moving picture, extracting a still picture at an interrupted timing if the moving picture reproduction is interrupted, combining the extracted still picture with a reproduction rate to generate a thumbnail image, and displaying the generated thumbnail image on a moving picture list.

The interrupted timing may be a reproduction-paused timing or reproduction-stopped timing.

The reproduction rate may include at least one of graphic image and numeral information.

The still picture at the interrupted timing may be a moving picture capture image.

The interrupt of the moving picture reproduction may be generated by at least one of user input, power shortage, device malfunction, and external shock.

In order to implement the foregoing objective, a moving picture reproduction method according to another embodiment of the present disclosure may include reproducing a moving picture, generating a thumbnail image based on a representative picture of the moving picture if the moving picture reproduction is stopped, generating a thumbnail image by combining a still picture at a pause timing with a reproduction rate if the moving picture reproduction is paused, and displaying the generated thumbnail image on a moving picture list.

In order to implement the foregoing objective, a mobile terminal according to an embodiment of the present disclosure may include a display unit reproducing a moving picture, and a controller extracting a still picture at an interrupted timing if the moving picture reproduction is interrupted, and combining the extracted still picture with a reproduction rate to generate a thumbnail image, and display the generated thumbnail image on a moving picture list.

In order to implement the foregoing objective, a mobile terminal according to another embodiment of the present disclosure may include a display unit reproducing a moving picture, and a controller generating a thumbnail image based on a representative picture of the moving picture if the moving picture reproduction is stopped, and generating a thumbnail image by combining a still picture at a pause timing with a reproduction rate if the moving picture reproduction is paused, and displaying the generated thumbnail image on a moving picture list.

According to a moving picture reproduction method and a mobile terminal using the same method in accordance with at least one embodiment of the present disclosure as described above, a thumbnail image in which a picture at a reproduction-interrupted position is combined with a graphic image indicating a reproduction progress state is displayed on a moving picture list screen, thereby allowing the user to intuitively and promptly grasp a reproduction history such as whether the relevant moving picture has been previously viewed, to which part of the relevant moving picture has been viewed, and the like, without reproducing moving pictures one by one.

In order to implement the foregoing objective, a moving picture reproduction method according to an embodiment of the present invention may include According to an embodiment of the present invention a moving picture reproduction method includes reproducing, via a display on the mobile terminal, a moving picture, extracting, via a controller on the mobile terminal, a still picture at an interrupted timing if the moving picture reproduction is interrupted, generating, via controller, a first thumbnail image by combining the extracted still picture with information about a reproduction rate, and displaying, via the display, the generated thumbnail image on a moving picture list.

In order to implement the foregoing objective, a mobile terminal according to an embodiment of the present invention may include a display unit configured to reproduce a moving picture, and a controller configured to extract a still picture at an interrupted timing if the moving picture reproduction is interrupted, to generate a first thumbnail image by combining the extracted still picture with information about a reproduction rate, and to display the generated thumbnail image on a moving picture list.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings:

FIG. 2 is a view illustrating a thumbnail displayed by a mobile terminal according to an embodiment of the present disclosure;

DETAILED DESCRIPTION OF THE INVENTION

Embodiments of the present disclosure will be described below in detail with reference to the accompanying drawings, where those components are rendered the same reference number that are the same or are in correspondence, regardless of the figure number, and redundant explanations are omitted. In describing the present disclosure, if a detailed explanation for a related known function or construction is considered to unnecessarily divert the gist of the present disclosure, such explanation has been omitted but would be understood by those skilled in the art. In the following description, usage of suffixes such as 'module', 'part' or 'unit' used for referring to elements is given merely to facilitate explanation of the present disclosure, without having any significant meaning by itself. In describing the present disclosure, if a detailed explanation for a related known function or construction is considered to unnecessarily divert the gist of the present disclosure, such explanation has been omitted but would be understood by those skilled in the art. The accompanying drawings of the present disclosure aim to facilitate understanding of the present disclosure and should not be construed as limited to the accompanying drawings.

Overall Configuration of Mobile Terminal

The mobile terminal described in the present disclosure may include mobile phones, smart phones, notebook computers, digital broadcast receivers, PDAs (Personal Digital Assistants), PMPs (Portable Multimedia Player), navigation devices, and the like. It would be understood by a person in the art that the configuration according to the embodiments of the present disclosure can be also applicable to the fixed types of terminals such as digital TVs, desk top computers, or the like, except for any elements especially configured for a mobile purpose.

Figure 1:
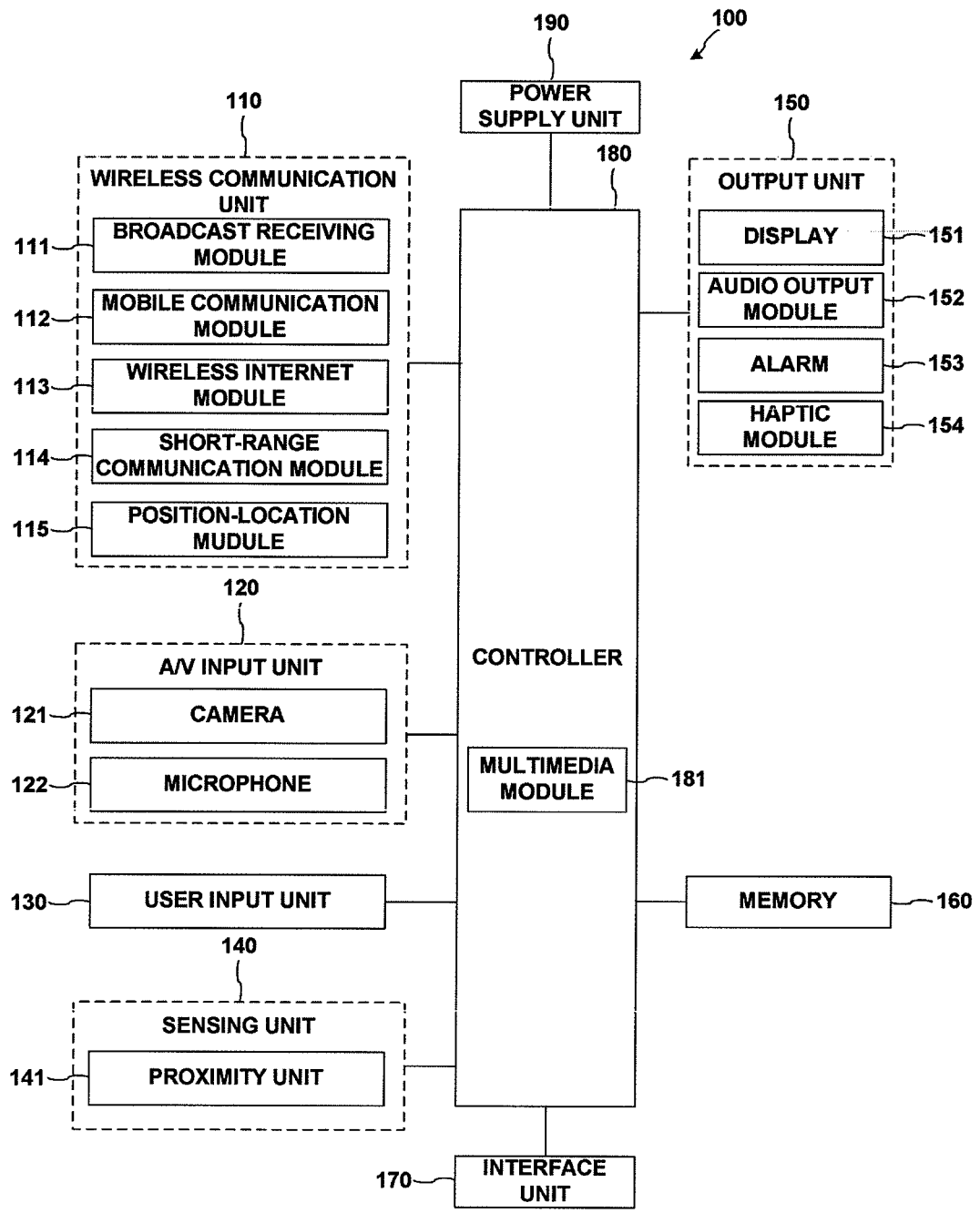
FIG. 1 is a schematic block diagram of a mobile terminal according to an exemplary embodiment of the present disclosure.

FIG. 1 is a schematic block diagram of a mobile terminal according to an embodiment of the present disclosure.

The mobile terminal 100 may include a wireless communication unit 110, an A/V (Audio/Video) input unit 120, a user input unit 130, a sensing unit 140, an output unit 150, a memory 160, an interface unit 170, a controller 180, and a power supply unit 190, and the like. FIG. 1 shows the mobile terminal as having various components, but it should be understood that implementing all of the illustrated components is not a requirement. Greater or fewer components may alternatively be implemented.

The elements of the mobile terminal will be described in detail as follows.

The wireless communication unit 110 typically includes one or more components allowing radio communication between the mobile terminal 100 and a wireless communication system or a network in which the mobile terminal is located. For example, the wireless communication unit 110 may include at least one of a broadcast receiving module 111, a mobile communication module 112, a wireless Internet module 113, a short-range communication module 114, and a position-location module 115.

The broadcast receiving module 111 receives broadcast signals and/or broadcast associated information from an external broadcast management server (or other network entity) via a broadcast channel. The broadcast associated information may refer to information associated with a broadcast channel, a broadcast program or a broadcast service provider. The broadcast associated information may also be provided via a mobile communication network and, in this case, the broadcast associated information may be received by the mobile communication module 112. Broadcast signals and/or broadcast-associated information received via the broadcast receiving module 111 may be stored in the memory 160 (or another type of storage medium).

The mobile communication module 112 transmits and/or receives radio signals to and/or from at least one of a base station (e.g., access point, Node B, and the like), an external terminal (e.g., other user devices) and a server (or other network entities). Such radio signals may include a voice call signal, a video call signal or various types of data according to text and/or multimedia message transmission and/or reception.

The wireless Internet module 113 supports wireless Internet access for the mobile terminal. This module may be internally or externally coupled to the terminal. The wireless Internet access technique implemented may include a WLAN (Wireless LAN) (Wi-Fi), Wibro (Wireless broadband), Wimax (World Interoperability for Microwave Access), HSDPA (High Speed Downlink Packet Access), LTE (Long Term Evolution), LTE-A (Long Term Evolution Advanced) or the like.

The short-range communication module 114 is a module for supporting short range communications. Some examples of short-range communication technology include Bluetooth™, Radio Frequency IDentification (RFID), Infrared Data Association (IrDA), Ultra-WideBand (UWB), ZigBee™, and the like.

The position-location module 115 is a module for checking or acquiring a location (or position) of the mobile terminal. A typical example of the position-location module is a GPS (Global Positioning System).

With reference to FIG. 1, the A/V input unit 120 receives an audio or image signal. The A/V input unit 120 may include a camera 121 (or other image capture device) or a microphone 122 (or other sound pick-up device). The camera 121 processes image frames of still pictures or video obtained by an image capture device in a video capturing mode or an image capturing mode. The processed image frames may be displayed on a display unit 151 (or other visual output device).

The image frames processed by the camera 121 may be stored in the memory 160 (or other storage medium) or transmitted via the wireless communication unit 110. Two or more cameras 121 may be provided according to the configuration of the mobile terminal.

The microphone 122 may receive sounds (audible data) via a microphone (or the like) in a phone call mode, a recording mode, a voice recognition mode, and the like, and can process such sounds into audio data. The processed audio (voice) data may be converted for output into a format transmittable to a mobile communication base station (or other network entity) via the mobile communication module 112 in case of the phone call mode. The microphone 122 may implement various types of noise canceling (or suppression) algorithms to cancel (or suppress) noise or interference generated in the course of receiving and transmitting audio signals.

The user input unit 130 (or other user input device) may generate input data from commands entered by a user to control various operations of the mobile terminal. The user input unit 130 may include a keypad, a dome switch, a touch pad (e.g., a touch sensitive member that detects changes in resistance, pressure, capacitance, and the like, due to being contacted), a jog wheel, a jog switch, and the like.

The sensing unit 140 (or other detection means) detects a current status (or state) of the mobile terminal 100 such as an opened or closed state of the mobile terminal 100, a location of the mobile terminal 100, the presence or absence of user contact with the mobile terminal 100 (i.e., touch inputs), the orientation of the mobile terminal 100, an acceleration or deceleration movement and direction of the mobile terminal 100, and the like, and generates commands or signals for controlling the operation of the mobile terminal 100. For example, when the mobile terminal 100 is implemented as a slide type mobile phone, the sensing unit 140 may sense whether the slide phone is opened or closed. In addition, the sensing unit 140 can detect whether or not the power supply unit 190 supplies power or whether or not the interface unit 170 is coupled with an external device. The sensing unit 140 may include a proximity unit 141.

The output unit 150 is configured to provide outputs in a visual, audible, and/or tactile manner (e.g., audio signal, image signal, alarm signal, vibration signal, etc.). The output unit 150 may include the display unit 151, an audio output module 152, an alarm unit 153, a haptic module 154, and the like.

The display unit 151 may display (output) information processed in the mobile terminal 100. For example, when the mobile terminal 100 is in a phone call mode, the display unit 151 may display a User Interface (UI) or a Graphic User Interface (GUI) associated with a call or other communication (such as text messaging, multimedia file downloading, and the like). When the mobile terminal 100 is in a video call mode or image capturing mode, the display unit 151 may display a captured image and/or received image, a UI or GUI that shows videos or images and functions related thereto, and the like.

The display unit 151 may include at least one of a Liquid Crystal Display (LCD), a Thin Film Transistor-LCD (TFT-LCD), an Organic Light Emitting Diode (OLED) display, a flexible display, a three-dimensional (3D) display, an e-ink display, or the like.

Some of them may be configured to be transparent or light-transmissive to allow viewing of the exterior, which may be called transparent displays. A typical transparent display may be, for example, a TOLED (Transparent Organic Light Emitting Diode) display, or the like. Through such configuration, the user can view an object positioned at the rear side of the terminal body through the region occupied by the display unit 151 of the terminal body.

The mobile terminal 100 may include two or more display units (or other display means) according to its particular desired embodiment. For example, a plurality of display units may be separately or integrally disposed on one surface of the mobile terminal, or may be separately disposed on mutually different surfaces.

Meanwhile, when the display unit 151 and a sensor (referred to as a 'touch sensor', hereinafter) for detecting a touch operation are overlaid in a layered manner to form a touch screen, the display unit 151 may function as both an input device and an output device. The touch sensor may have a form of a touch film, a touch sheet, a touch pad, and the like.

The touch sensor may convert pressure applied to a particular portion of the display unit 151 or a change in the capacitance or the like generated at a particular portion of the display unit 151 into an electrical input signal. The touch sensor may detect the pressure when a touch is applied, as well as the touched position and area.

When there is a touch input with respect to the touch sensor, a corresponding signal (signals) are transmitted to a touch controller. The touch controller processes the signals and transmits corresponding data to the controller 180. Accordingly, the controller 180 may recognize which portion of the display unit 151 has been touched.

With reference to FIG. 1, a proximity unit 141 may be disposed within or near the touch screen. The proximity unit 141 is a sensor for detecting the presence or absence of an object relative to a certain detection surface or an object that exists nearby by using the force of electromagnetism or infrared rays without a physical contact. Thus, the proximity unit 141 has a considerably longer life span compared with a contact type sensor, and it can be utilized for various purposes.

Examples of the proximity unit 141 may include a transmission type photoelectric sensor, a direct reflection type photoelectric sensor, a mirror-reflection type photo sensor, an RF oscillation type proximity sensor, a capacitance type proximity sensor, a magnetic proximity sensor, an infrared proximity sensor, and the like. In case where the touch screen is the capacitance type, proximity of the pointer is detected by a change in electric field according to the proximity of the pointer. In this case, the touch screen (touch sensor) may be classified as a proximity unit.

The audio output module 152 may convert and output sound audio data received from the wireless communication unit 110 or stored in the memory 160 in a call signal reception mode, a call mode, a record mode, a voice recognition mode, a broadcast reception mode, and the like. Also, the audio output module 152 may provide audible outputs related to a particular function performed by the mobile terminal 100 (e.g., a call signal reception sound, a message reception sound, etc.). The audio output module 152 may include a receiver, a speaker, a buzzer, or other sound generating device.

The alarm unit 153 (or other type of user notification means) may provide outputs to inform about the occurrence of an event of the mobile terminal 100. Typical events may include call reception, message reception, key signal inputs, a touch input etc. In addition to audio or video outputs, the alarm unit 153 may provide outputs in a different manner to inform about the occurrence of an event. For example, the alarm unit 153 may provide an output in the form of vibrations (or other tactile or sensible outputs). When a call, a message, or some other incoming communication is received, the alarm unit 153 may provide tactile outputs (i.e., vibrations) to inform the user thereof. By providing such tactile outputs, the user can recognize the occurrence of various events even if his mobile phone is in the user's pocket. Outputs informing about the occurrence of an event may be also provided via the display unit 151 or the audio output module 152. The display unit 151 and the audio output module 152 may be classified as a part of the alarm unit 153.

The haptic module 154 generates various tactile effects the user may feel. A typical example of the tactile effects generated by the haptic module 154 is vibration. The strength and pattern of the haptic module 154 can be controlled. For example, different vibrations may be combined to be outputted or sequentially outputted.

Besides vibration, the haptic module 154 may generate various other tactile effects such as an effect by stimulation such as a pin arrangement vertically moving with respect to a contact skin, a spray force or suction force of air through a jet orifice or a suction opening, a contact on the skin, a contact of an electrode, electrostatic force, and the like, an effect by reproducing the sense of cold and warmth using an element that can absorb or generate heat.

The haptic module 154 may be implemented to allow the user to feel a tactile effect through a muscle sensation such as fingers or arm of the user, as well as transferring the tactile effect through a direct contact. Two or more haptic modules 154 may be provided according to the configuration of the mobile terminal 100.

The memory 160 may store software programs used for the processing and controlling operations performed by the controller 180, or may temporarily store data (e.g., a phonebook, messages, still images, video, etc.) that are inputted or outputted. In addition, the memory 160 may store data regarding various patterns of vibrations and audio signals outputted when a touch is inputted to the touch screen.

The memory 160 may include at least one type of storage medium including a Flash memory, a hard disk, a multimedia card micro type, a card-type memory (e.g., SD or XD memory, etc), a Random Access Memory (RAM), a Static Random Access Memory (SRAM), a Read-Only Memory (ROM), an Electrically Erasable Programmable Read-Only Memory (EEPROM), a Programmable Read-Only memory (PROM), a magnetic memory, a magnetic disk, and an optical disk. Also, the mobile terminal 100 may be operated in relation to a web storage device that performs the storage function of the memory 160 over the Internet.

The interface unit 170 serves as an interface with every external device connected with the mobile terminal 100. For example, the external devices may transmit data to an external device, receives and transmits power to each element of the mobile terminal 100, or transmits internal data of the mobile terminal 100 to an external device. For example, the interface unit 170 may include wired or wireless headset ports, external power supply ports, wired or wireless data ports, memory card ports, ports for connecting a device having an identification module, audio input/output (I/O) ports, video I/O ports, earphone ports, or the like.

The identification module may be a chip that stores various information for authenticating the authority of using the mobile terminal 100 and may include a user identity module (VIM), a subscriber identity module (SIM), a universal subscriber identity module (USIM), and the like. In addition, the device having the identification module (referred to as 'identifying device', hereinafter) may take the form of a smart card. Accordingly, the identifying device may be connected with the terminal 100 via a port.

When the mobile terminal 100 is connected with an external cradle, the interface unit 170 may serve as a passage to allow power from the cradle to be supplied therethrough to the mobile terminal 100 or may serve as a passage to allow various command signals inputted by the user from the cradle to be transferred to the mobile terminal therethrough. Various command signals or power inputted from the cradle may operate as signals for recognizing that the mobile terminal is properly mounted on the cradle.

The controller 180 typically controls the general operations of the mobile terminal 100. For example, the controller 180 performs controlling and processing associated with voice calls, data communications, video calls, and the like. The controller 180 may include a multimedia module 181 for reproducing multimedia data. The multimedia module 181 may be configured within the controller 180 or may be configured to be separated from the controller 180.

The controller 180 may perform a pattern recognition processing to recognize a handwriting input or a picture drawing input performed on the touch screen as characters or images, respectively.

The power supply unit 190 receives external power or internal power and supplies appropriate power required for operating respective elements and components under the control of the controller 180.

Various embodiments described herein may be implemented in a computer-readable or its similar medium using, for example, software, hardware, or any combination thereof.

For hardware implementation, the embodiments described herein may be implemented by using at least one of application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic units designed to perform the functions described herein. In some cases, such embodiments may be implemented by the controller 180 itself.

For software implementation, the embodiments such as procedures or functions described herein may be implemented by separate software modules. Each software module may perform one or more functions or operations described herein. Software codes can be implemented by a software application written in any suitable programming language. The software codes may be stored in the memory 160 and executed by the controller 180.

Method for Processing User Input with Respect to Mobile Terminal

The user input units 130 is manipulated to receive a command for controlling the operation of the mobile terminal 100 and may include a plurality of manipulation units 131 and 132. The manipulation units 131 and 132 may be generally referred to as a manipulating portion, and various methods and techniques can be employed for the manipulation portion so long as they can be operated by the user in a tactile manner.

The display unit 151 can display various types of visual information. These information may be displayed in the form of characters, numerals, symbols, graphic or icons. In order to input such information, at least one of the characters, numerals, symbols, graphic and icons may be displayed in predetermined arrangement in the form of a keypad. Also, the keypad can be referred to as a 'soft key'.

The display unit 151 may be operated as an entire area or may be divided into a plurality of regions so as to be operated. In the latter case, the plurality of regions may be configured to be operated in association with each other.

For example, an output window and an input window may be displayed at an upper portion and a lower portion of the display unit 151. The output window and the input window are regions allocated to output or input information, respectively. Soft keys marked by numbers for inputting a phone number or the like may be outputted to the input window.

When a soft key is touched, a number or the like corresponding to the touched soft key may be displayed on the output window. When the manipulation unit is manipulated, a call connection to the phone number displayed on the output window may be attempted or text displayed on the output window may be inputted to an application.

The display unit 151 or a touch pad may be configured to receive a touch through scrolling. The user can move an entity displayed on the display unit 151, for example, a cursor or a pointer positioned on an icon or the like, by scrolling the touch pad. In addition, when the user moves his finger on the display unit 151 or on the touch pad, a path along which the user's finger moves may be visually displayed on the display unit 151. This can be useful in editing an image displayed on the display unit 151.

A certain function of the terminal may be executed when the display unit 151 (touch screen) and the touch pad are touched together within a certain time range. For example, the display unit 151 and the touch pad may be touched together when the user clamps the terminal body by using his thumb and index fingers. The certain function may be activation or deactivation of the display unit 151 or the touch pad.

Exemplary embodiments related to a control method that can be implemented in the terminal configured as described above will now be described with reference to the accompanying drawings. The exemplary embodiments to be described may be solely used or may be combined to be used. Also, the exemplary embodiments to be described may be combined with the foregoing user interface (UI) so as to be used.

Moving Picture List Provided by a Moving Picture Providing Device

A moving picture providing device is a device for directly reproducing moving pictures or transmitting moving picture data to reproduce moving pictures. Here, the moving picture providing device may be an internet moving picture streaming server, a stationary terminal, a mobile terminal, or the like.

The moving picture providing device provides or displays a moving picture list to the user, thereby allowing the user to select his or her desired moving picture. The moving picture list may be displayed with a title, an extension, a length, a created time/modified time, format information, and the like for a moving picture, and may be displayed with a representative picture, a thumbnail, and the like for a moving picture.

Typically, a representative picture denotes a still picture shown prior to a moving picture being actually reproduced, and it may be a first picture of the moving picture, a ten seconds later picture of the moving picture after the reproduction, or a specific timing picture of the moving picture set at the user's discretion.

In addition, a thumbnail typically denotes a reduced image, and the thumbnail may be a small photo/still picture created correspondingly to a large photo/still picture, a still picture constituting a moving picture, a small still picture created correspondingly to the still picture constituting a moving picture, and the like.

On the other hand, such a representative picture/thumbnail may be inserted into each moving picture file in the form of metadata, and may be separately stored in a memory of the moving picture providing device for providing each moving picture. The moving picture providing device loads a representative picture/thumbnail inserted into the moving picture file or stored separately therein to provide it to the user or display it on the screen.

The moving picture providing device may display a representative picture of each moving picture on a moving picture list screen. Particularly, the moving picture providing device may display the representative picture in the form of a thumbnail having a smaller size than that of the original frame. If moving picture reproduction is interrupted (suspended or stopped), then the moving picture providing device may display a moving picture list screen again.

Moving Picture Reproduction Method and a Mobile Terminal Using the Same Method

According to the present disclosure, there is proposed a method in which when moving picture reproduction is interrupted, a moving picture at an interrupted timing (or interrupted position) is selected as a thumbnail image, and the thumbnail image is graphically combined and displayed with a location of the interrupted timing (interrupted position) or a reproduction progress state, thereby intuitively informing the reproduction-interrupted location, reproduction position or reproduction progress state of a moving picture to the user. Here, the case when moving picture reproduction is interrupted may include a case when the moving picture reproduction is paused, a case when the moving picture reproduction is stopped, and the like.

The present disclosure may be applicable to various moving picture providing devices. For example, the present disclosure may be applicable to an internet moving picture streaming server, a stationary terminal, a mobile terminal, or the like.

In case where the present disclosure is applied to an internet moving picture streaming server, the server may generate a thumbnail in which an image at a position where moving picture reproduction is interrupted (paused or stopped) by the access user is combined with a graphic image (for example, numeral, progress bar or the like indicating a progress rate) indicating a reproduction progress state (reproduction interrupted position).

The server checks whether the access user has a previous access history through user access information such as log-in/sign-in information, cookie information, and the like. If a previously reproduction-interrupted moving picture is included in a moving picture list provided to the access user, then the server may provide information on a previous interrupted position to the access user by displaying a previously generated thumbnail.

If the access user reproduces the previously reproduction-interrupted moving picture again, then the server may start moving picture reproduction from the previous interrupted position, or start reproduction from the beginning of the moving picture, thereby allowing the user to select his or her desired position.

In case where the present disclosure is applied to a mobile terminal, the mobile terminal may generate a thumbnail in which an image at a position where moving picture reproduction is interrupted (paused or stopped) by the user is combined with a graphic image (for example, numeral, progress bar or the like indicating a progress rate) indicating a reproduction progress state (reproduction interrupted position).

If a previously reproduction-interrupted moving picture is included in a moving picture list provided to the user, then the mobile terminal may provide information on a previous interrupted position to the user by displaying a previously generated thumbnail.

If the user reproduces the previously reproduction-interrupted moving picture again, then the mobile terminal may start moving picture reproduction from the previous interrupted position, or start reproduction from the beginning of the moving picture, thereby allowing the user to select his or her desired position.

Hereinafter, for the sake of brief explanation, it is assumed that the moving picture providing device is a mobile terminal. However, it should be noted that a case where the picture providing device is a mobile terminal is employed merely to describe an embodiment of the present disclosure but the technical spirit of the present disclosure will not be limited to the embodiment. For example, the present disclosure may be also applicable to a case where the moving picture providing device is a stationary terminal such as a personal computer (PC) or the like.

The controller 180 may reproduce a moving picture. The controller 180 may include a multimedia module 181 for moving picture reproduction, or a separate multimedia module 181 may be included in the mobile terminal 100.

If moving picture reproduction is interrupted by the user, then the controller 180 may determine whether the moving picture reproduction is paused or stopped.

In case where the moving picture reproduction is paused, the controller 180 extracts a still picture at the reproduction-paused position, and generates a graphic image indicating a reproduction progress state. Then, the 180 generates a thumbnail from a result of combining the extracted still picture with the generated graphic image. The controller 180 may generate a thumbnail from the extracted still picture, and then combine the generated thumbnail with a graphic image.

The controller 180 may extract a moving picture capture image at the reproduction-paused position as the still picture. Particularly, if the moving picture is encoded by the MPEG (moving picture experts group), then the controller 180 may extract a still picture which is an intra picture. The intra picture (i-picture) is a reference picture of GOP (group of picture), which is a unit of random access.

The graphic image indicating a reproduction progress state may be a user interface element having a progress state display function. For example, the UI element may be a numeral (percent progress), a progress bar or the like indicating a progress state. Particularly, the progress bar may be configured in a manner of displaying a foreground progress bar indicating a currently reproduced timing or position on a background progress bar indicating a total reproduction time.

As described above, the controller 180 may combine the still picture with the graphic image, and then reduce the combined picture again to generate a thumbnail. Otherwise, the controller 180 may reduce the still picture, and then combine the reduced still picture with the graphic image to generate a thumbnail.

On the other hand, if the moving picture reproduction is stopped, then the controller 180 may extract a representative picture, and generate a thumbnail corresponding to the extracted representative picture. Here, the controller 180 may generate a thumbnail by reducing the extracted representative picture.

Otherwise, the controller 180 may extract a still picture at a reproduction-stopped position to generate a thumbnail in a manner similar to a case where moving picture reproduction is paused. In other words, the controller 180 may generate a thumbnail from a result of combining the extracted still picture with a graphic image indicating a reproduction progress state.

The controller 180 may display a thumbnail for each moving picture in displaying a moving picture list. At this time, for a moving picture that has not been reproduced by the user, the controller 180 may display a thumbnail for a representative picture of the moving picture. For a moving picture that the reproduction is paused by the user, the controller 180 may display a thumbnail in which a still picture at a reproduction-interrupted position of the moving picture is combined with a graphic image indicating a reproduction progress rate. For a moving picture that the reproduction is stopped by the user, the controller 180 may display a thumbnail for a representative picture of the moving picture, or display a thumbnail in which a still picture at a reproduction-interrupted position is combined with a graphic image indicating a reproduction progress rate.

FIG. 2 is an exemplary view illustrating a thumbnail displayed by a mobile terminal according to an embodiment of the present disclosure.

As illustrated in FIG. 2, for a moving picture that has not been previously reproduced or reproduction has been stopped, the controller 180 may display a thumbnail 210 for a representative picture of the moving picture on a moving picture list. Also, for a reproduction-paused moving picture or reproduction-stopped moving picture, the controller 180 may display a thumbnail 220, 230, 240 in which a still picture at a reproduction-interrupted position of the moving picture combined with a graphic image indicating a reproduction progress rate on a moving picture list.

As illustrated in FIG. 2, the graphic image indicating a reproduction progress rate may be a progress bar 220, a numeral 230, a plurality of bars 240, and the like.

Figure 3:
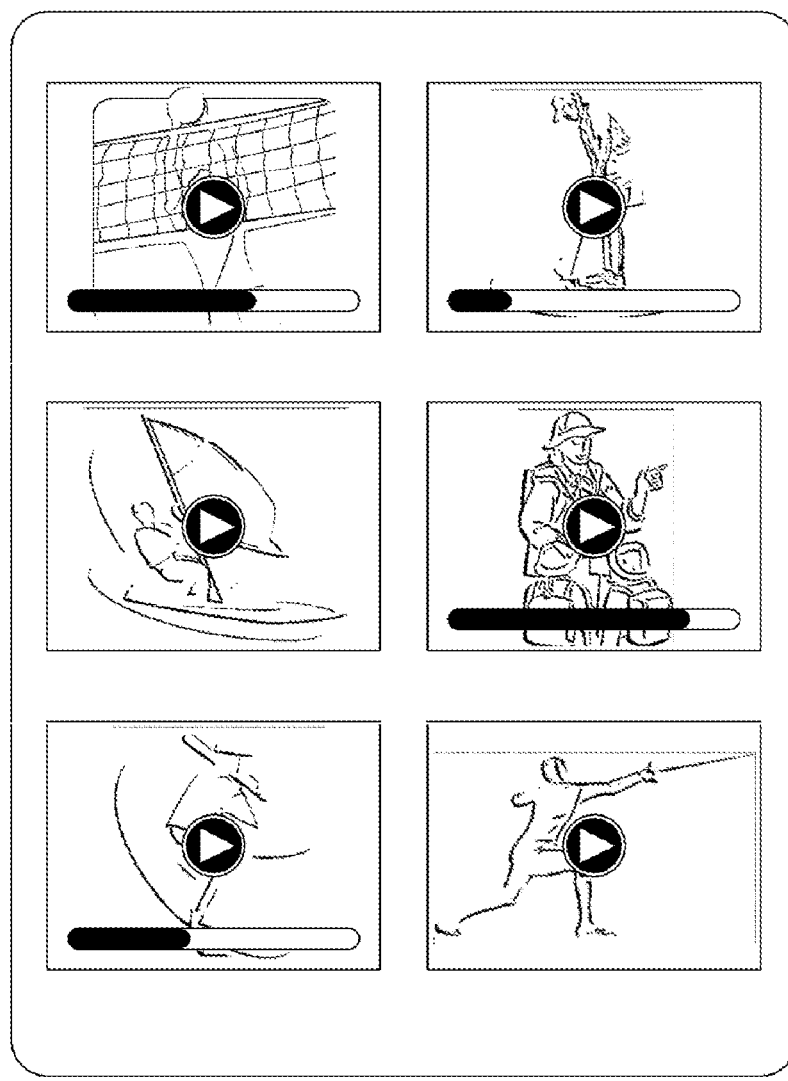
FIG. 3 is a view illustrating a moving picture list displayed by a mobile terminal according to an embodiment of the present disclosure.

FIG. 3 is an exemplary view illustrating a moving picture list displayed by a mobile terminal according to an embodiment of the present disclosure.

As illustrated in FIG. 3, the controller 180 may display a thumbnail of each moving picture on a moving picture list, thereby allowing the user to easily distinguish a case where the moving picture has not been reproduced from a case where the reproduction has been paused or stopped as well as intuitively grasp a reproduction-stopped position.

If the reproduction of a moving picture that has not been previously reproduced is selected by the user (for example, the play button is touched), then the controller 180 reproduces the moving picture from the beginning. If the reproduction of a moving picture that reproduction has been previously stopped is selected by the user (for example, the play button is touched), then the controller 180 may reproduce the moving picture from a reproduction-stopped position, or reproduce the moving picture from the beginning. The selection for a reproduction started position thereof when moving picture reproduction is stopped and then reproduced again, may be determined in advance or based on the user's setup.

Figure 4:
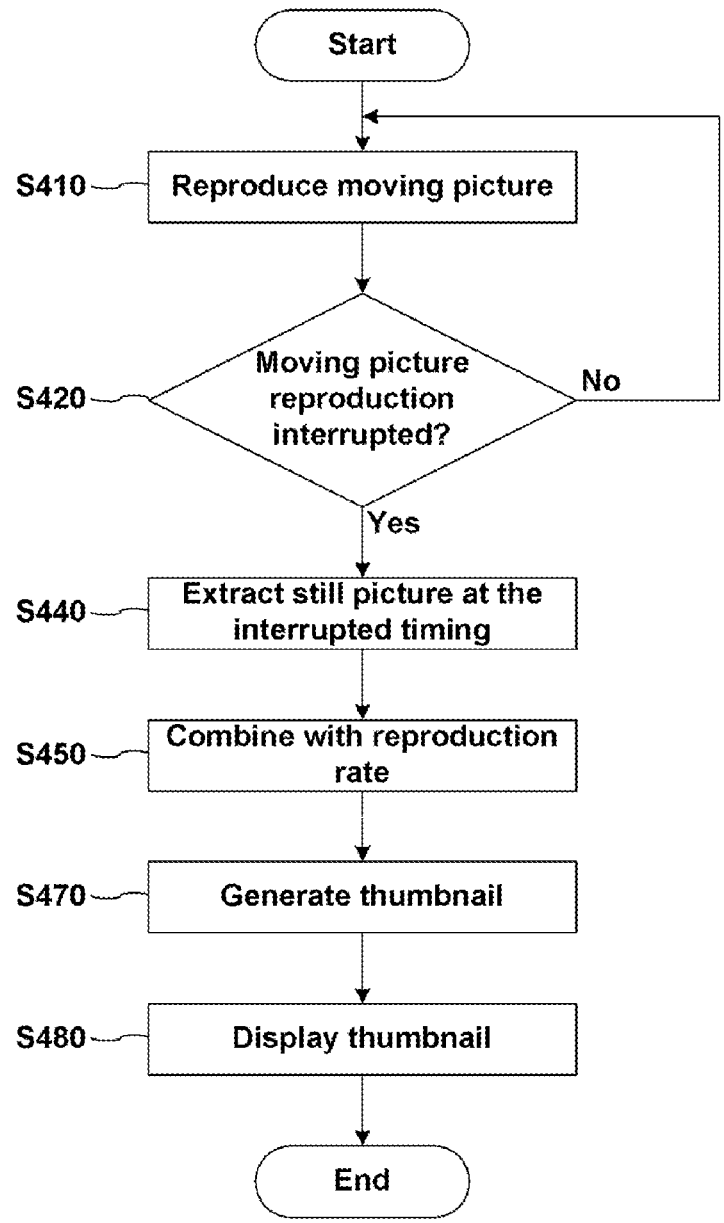
FIG. 4 is a flow chart illustrating a moving picture reproduction method according to an embodiment of the present disclosure.

FIG. 4 is a flow chart illustrating a moving picture reproduction method according to an embodiment of the present disclosure.

Referring to FIG. 4, first, the mobile terminal 100 reproduces a moving picture (S410).

Then, the mobile terminal 100 determines whether moving picture reproduction has been interrupted (paused or stopped) (S420), and continues to reproduce moving picture reproduction (S410) if the moving picture reproduction has not been interrupted, and extracts a still picture at a interrupted position (S440) if the moving picture reproduction has been interrupted.

Here, the interrupt of the moving picture reproduction may be generated by at least one of user input, power shortage, device malfunction, and external shock. Then, the mobile terminal 100 may extract a moving picture capture screen image as a still picture at the interrupted position.

Then, the mobile terminal 100 combines the extracted still picture with a reproduction rate (S450), and generates a thumbnail image (S470). Here, the reproduction rate denotes a reproduction progress rate or reproduction progress state, and may include at least one of graphic image or numeral information.

At this time, the mobile terminal 100 may generate a thumbnail image by reducing an image in which the extracted still picture is combined with a reproduction rate or by reducing the extracted still picture and then combining with a reproduction rate.

Next, the mobile terminal 100 displays the generated thumbnail image on a moving picture list (S480).

The moving picture reproduction method according to an embodiment of the present disclosure may be understood similarly to a mobile terminal that has been described according to the foregoing embodiment of the present disclosure with reference to FIGS. 1 through 3, and the detailed description will be omitted below.

Figure 5:
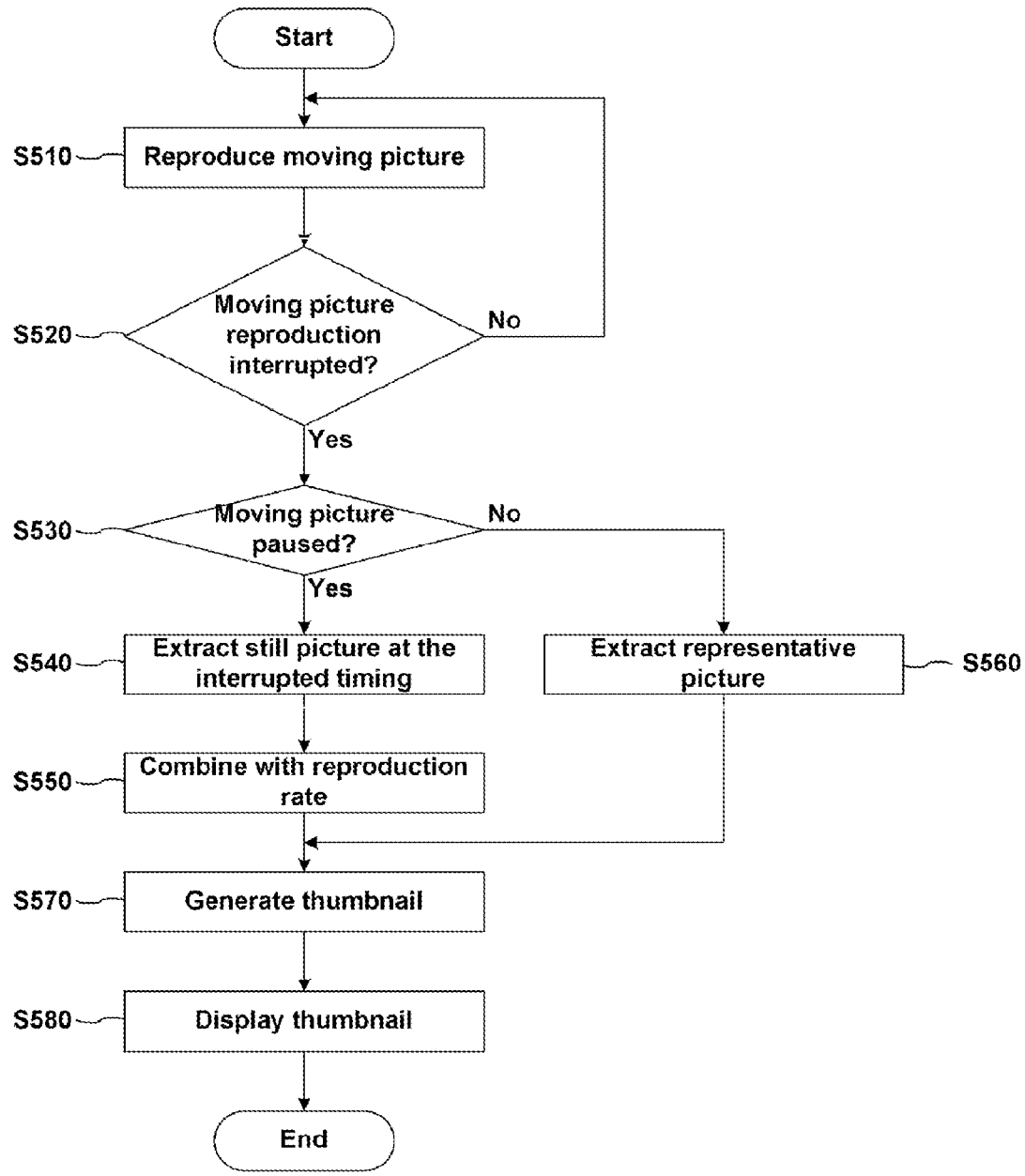
FIG. 5 is a flow chart illustrating a moving picture reproduction method according to another embodiment of the present disclosure.

FIG. 5 is a flow chart illustrating a moving picture reproduction method according to another embodiment of the present disclosure.

Referring to FIG. 5, first, the mobile terminal 100 reproduces a moving picture (S510).

Then, the mobile terminal 100 determines whether moving picture reproduction has been interrupted (paused or stopped) (S520), and continues to reproduce moving picture reproduction (S510) if the moving picture reproduction has not been interrupted, and determines whether the moving picture has been pause or stopped (S530) if the moving picture reproduction has been interrupted.

When moving picture reproduction is paused, the mobile terminal 100 extracts a still picture at the interrupted position (S540), and combines the extracted still picture with a reproduction rate (S550). When moving picture reproduction is stopped, the mobile terminal 100 extracts a representative picture of the moving picture (S560).

Then, the mobile terminal 100 generates a thumbnail image based on the still picture combined with a reproduction rate or representative picture, respectively, according to whether moving picture reproduction has been paused or stopped (S570).

Next, the mobile terminal 100 displays the generated thumbnail image on a moving picture list (S580).

The moving picture reproduction method according to another embodiment of the present disclosure may be understood similarly to a mobile terminal that has been described according to the foregoing embodiment of the present disclosure and a moving picture reproduction method according to the foregoing embodiment of the present disclosure with reference to FIGS. 1 through 4, and the detailed description will be omitted below.

Furthermore, according to an embodiment of the present disclosure, the foregoing method may be implemented as codes readable by a computer on a medium written by the program. Examples of the computer-readable media may include ROM, RAM, CD-ROM, magnetic tape, floppy disk, and optical data storage device, and the like, and also include a device implemented via a carrier wave (for example, a transmission via the Internet).

The configurations and methods according to the above-described embodiments will not be applicable in a limited way to the foregoing terminal, and all or part of each embodiment may be selectively combined and configured to make various modifications thereto.

As described above, preferred embodiments of the present disclosure have been described with reference to the accompanying drawings.

Here, the terms and words used herein and the claims should not be construed by limiting to their typical or lexical meaning, but should be construed based on the meaning and concept conforming to the technical spirit of the present disclosure.

Accordingly, the configuration illustrated in the embodiments disclosed herein and the drawings is merely the most preferred embodiment of the present disclosure, and is not intended to represent all the technical spirit of the present disclosure, and thereby it should be appreciated that there may exist various equivalents and modifications for substituting those at the time of filing this application.

What is claimed is:

1. A method of controlling a mobile terminal, the method comprising:
   reproducing, via a display on the mobile terminal, a moving picture;
   extracting, via a controller on the mobile terminal, a still picture at an interrupted timing when the moving picture reproduction is interrupted;
   generating, via the controller after the reproducing of the moving picture begins and in response to the moving picture reproduction being interrupted, at least one of a graphic image and numeral information that represents information about a reproduction rate, said information about the reproduction rate not being a time status of the reproduction of the moving picture; and
   after the moving picture has been interrupted and is not being reproduced, displaying, via the display, the still picture overlapped by the at least one of the graphic image and the numeral information on the moving picture,
   wherein the still picture overlapped by the at least one of the graphic image and the numeral information are displayed together on a moving picture list that is for selecting a moving picture to be reproduced from a list of moving pictures, and
   wherein the at least one of the graphic iamge and the numeral information is only displayed on the moving picture list if a respective moving picture has been reproduced on the display and then interrupted and is not displayed on the moving picture list if a respective moving picture has not yet been reproduced on the display, thereby distinguishing the moving picture that has been reproduced and interrupted from the moving picture that has not been reproduced.

2. The method of claim 1, wherein the interrupted timing is a position of the moving picture where the reproduction is paused or stopped.

3. The method of claim 1, wherein the interruption of the moving picture reproduction is generated by at least one of a user input, a power shortage, a device malfunction, and an external shock.

4. The method of claim 1, wherein the still picture and the at least one of the graphic image and the numeral information are displayed as a first thumbnail image corresponding to a reduced size of a combination of the still picture and the progress state bar.

5. The method of claim 4, further comprising:
   displaying a second thumbnail image based on a representative picture of the moving picture when the moving picture reproduction is stopped; and
   displaying the first and second thumbnail images on the moving picture list,
   wherein the interrupted timing is a paused timing.

6. The method of claim 5, wherein the still picture at the paused timing is a captured image of the moving picture.

7. A mobile terminal, comprising:
   a display unit configured to reproduce a moving picture; and
   a controller configured to:
   control the display unit to extract a still picture at an interrupted timing when the moving picture reproduction is interrupted, generate after the reproducing of the moving picture begins and in response to the moving picture reproduction being interrupted, at least one of a graphic image and numeral information that represents information about a reproduction rate, said information about the reproduction rate not being a time status of the reproduction of the moving picture, and display, after the moving picture has been interrupted and is not being reproduced, the still picture overlapped by the at least one of the graphic image and the numeral information on the moving picture, wherein the still picture overlapped by the at least one of the graphic image and the numeral information are displayed together on a moving picture list that is for selecting a moving picture to be reproduced from a list of moving pictures, and wherein the at least one of the graphic image and the numeral information is only displayed on the moving picture list if a respective moving picture has been reproduced on the display and then interrupted and is not displayed on the moving picture list if a respective moving picture has not yet been reproduced on the display, thereby distinguishing the moving picture that has been reproduced and interrupted from the moving picture that has not been reproduced.

8. The mobile terminal of claim 7, wherein the interrupted timing is a position of the moving picture where the reproduction is paused or stopped.

9. The mobile terminal of claim 7, wherein the controller is further configured to interrupt the moving picture reproduction based on at least one of a user input, a power shortage, a device malfunction, and an external shock.

10. The mobile terminal of claim 7, wherein the still picture and the at least one of the graphic image and the numeral information are displayed as a first thumbnail image corresponding to a reduced size of a combination of the still picture and the progress state bar.

11. The mobile terminal of claim 10, wherein the controller is further configured to display a second thumbnail image based on a representative picture of the moving picture when the moving picture reproduction is stopped, and display the first and second thumbnail images on the moving picture, and wherein the interrupted timing is a paused timing.

12. The mobile terminal of claim 11, wherein the still picture at the paused timing is a moving picture captured image.

13. The method of claim 1, wherein the still picture at the interrupted timing is a moving picture captured image.

14. The mobile of terminal of claim 7, wherein the still picture at the interrupted timing is a moving picture captured image.

15. The method of claim 1, further comprising:
 interrupting the moving picture reproduction by at least one of a power shortage, a device malfunction, and an external shock; and
 displaying a moving picture list,
 wherein the still picture overlapped by at least one of the graphics image and the numeral information is displayed on the moving picture list.

16. The mobile terminal of claim 7, wherein the controller is further configured to interrupt the moving picture reproduction by at least one of a power shortage, a device malfunction, and an external shock, and to display a moving picture list, and wherein the still picture overlapped by at least one of the graphic image and the numeral information is displayed on the moving picture list.

\* \* \* \* \*